Jan. 22, 1957 R. E. SELTZER 2,778,540
AGRICULTURAL MATERIAL DISTRIBUTOR
Filed Feb. 20, 1952
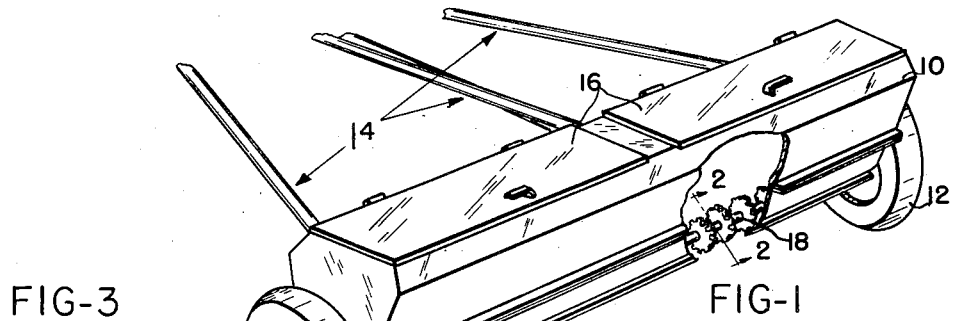
FIG-1
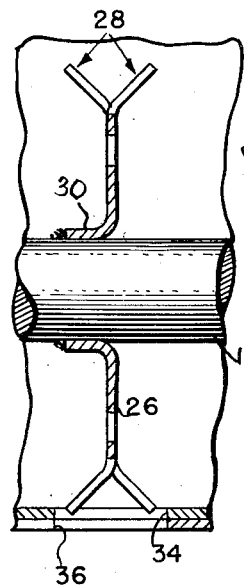
FIG-3
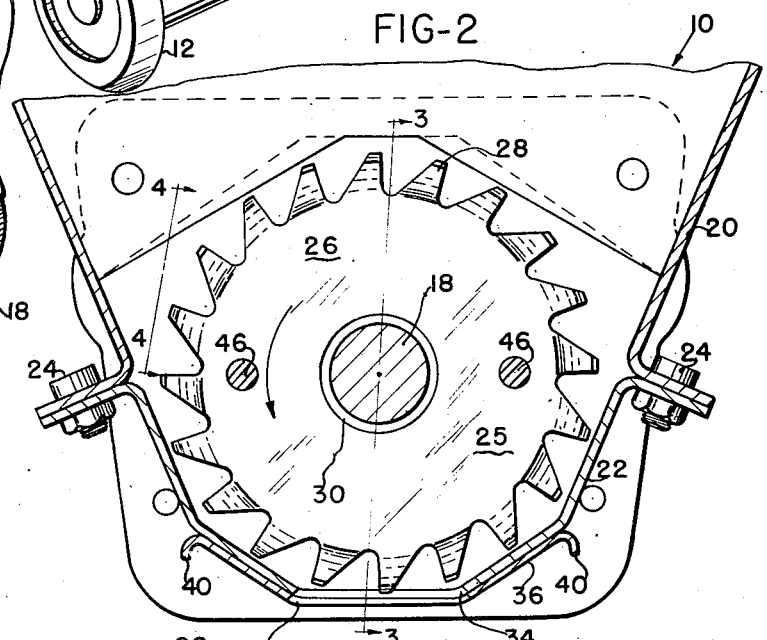
FIG-2
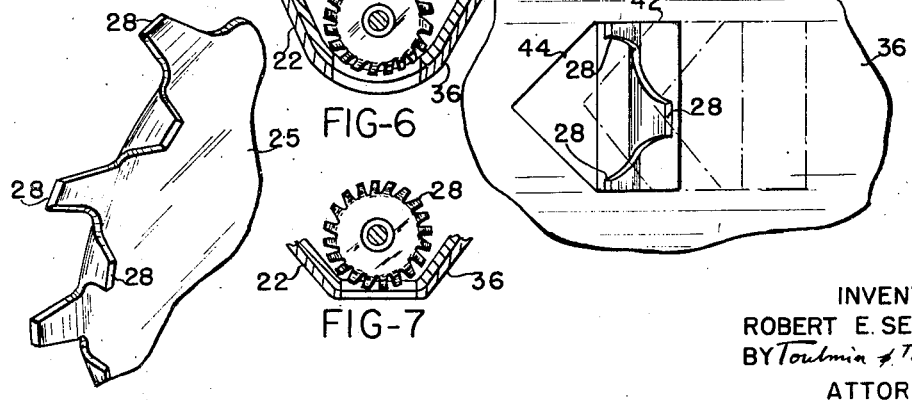
FIG-4 FIG-6 FIG-5
FIG-7
INVENTOR
ROBERT E. SELTZER
BY Toulmin & Toulmin
ATTORNEYS

United States Patent Office 2,778,540
Patented Jan. 22, 1957

2,778,540

AGRICULTURAL MATERIAL DISTRIBUTOR

Robert E. Seltzer, Bellevue, Ohio, assignor, by mesne assignments, to Spred-All, Inc., Bellevue, Ohio, a corporation of Ohio Application February 20, 1952, Serial No. 272,588

9 Claims. (Cl. 222—274)

This invention relates to material spreading apparatus, and particularly to the feed mechanism of such spreaders. Spreaders of the nature referred to are widely used in agricultural work for spreading material for treating soil and also for treating vegetation. Such material will vary from a readily flowing chemical material, such as lime and certain types of fertilizers, grains, grass seeds, and the like, to other types of materials which are either sticky or which tend to clump together forming a relatively hard lump.

Also, most of the materials employed in such a distributor are purchased, and, in many cases, have become packed down hard in the bags in which they are shipped, thereby making it necessary for the lumps therein to be broken up before discharge from the spreading device.

The materials which the spreader is adapted for handling will vary widely in the amounts that are to be distributed and rates as small as twenty-five to fifty pounds per acre will be dispensed, and other materials will require a dispensing rate of over three tons per acre.

From the foregoing, it will be apparent that a material spreading apparatus, in order to meet the widely varying conditions of usage to which it will be put, must be able to handle a great variety of materials, to break up lumps in the material when necessary, to provide for an even flow of the material to the distributor openings in the device, to feed the material through the openings, and to provide for an extremely wide variation in the rate of discharge of the material from the openings.

Having the foregoing in mind, the primary object of the present invention is to provide an agricultural material distributor of the nature referred to having an improved feeding action.

Another object is the provision of a feeding device for a spreader of the nature referred to operable to maintain a uniform flow of the material dispensed, even though the material is lumpy or sticky.

Another object is the provision of an agitator arrangement for a material spreader which is relatively simple to manufacture.

A still further object of this invention is to provide in combination with a rotary agitator for a material spreader a hopper of such configuration that it cooperates with the agitator to maintain a uniform flow of material from the dispensing apparatus at all times.

A particular object is the provision of a material spreader and an agitator therefor capable of adjustment of the dispensing rate between exceedingly wide limits.

A still further object of this invention is the provision of a spreading device of the nature described which can readily be dismantled for the thorough cleaning thereof when necessary.

These and other objects and advantages will become more apparent upon reference to the following description taken in connection with the accompanying drawings, in which:

Figure 1 is a perspective view of a material spreader according to the present invention;

Figure 2 is a transverse section through the lower portion of the spreader, indicated by line 2—2 on Figure 1 and showing the construction of the bottom part of the hopper on the agitator, the feed opening from which the material is dispensed, and the slide plate on the bottom of the hopper which varies the effective size of the opening;

Figure 3 is a vertical section, indicated by line 3—3 on Figure 2;

Figure 4 is a perspective view showing one of the agitator blades;

Figure 5 is a view looking up from beneath the hopper showing the appearance of the feed opening in the bottom of the hopper and the slide plate;

Figure 6 is a fragmentary view like Figure 2 showing another form which the lower part of the hopper can take; and Figure 7 is a view like Figure 6 but showing still another modified form of the hopper.

Referring to the drawings somewhat more in detail, the material spreader illustrated in the drawings comprises a hopper 10 supported on ground wheels 12 and having projecting from one side thereof a hitch frame, generally indicated at 14, so the device can be drawn by a suitable draft means. The hopper has openings at the top closed by the lids 16 which can be opened for supplying the material to be dispensed to the hopper.

Ground wheels 12 are connected, either directly or through suitable gearing, with an agitator shaft 18 extending the length of the hopper and suitably supported at its opposite ends in bearings carried by the hopper and including an intermediate bearing support, if desired.

Preferably, shaft 18 is divided into two parts with one part being driven by each of the ground wheels 12, but, optionally, shaft 18 can be driven by only one wheel or overrunning clutch devices can be included in the drive from the wheels, all of the arrangements referred to permitting turning of the dispenser without imposing undue loads on the agitator shaft.

As will best be seen in Figure 2, hopper 10 comprises an upper portion 20 and a lower portion 22, both flanged and interconnected by the bolts 24 extending through the flanges. Bottom portion 22 is advantageously shaped to a polygonal configuration, as illustrated in Figure 2, so as to extend about the periphery of the agitator blades 25 with a minimum of clearance. The particular shape designated for the bottom part of the hopper in Figure 2 is the preferred shape for this member to take because it can easily be formed by conventional manufacturing processes, while still leaving only a minimum amount of space that is not effectively swept by the agitator blades.

The agitator blades, as will be seen in Figures 2, 3, and 4, consist of a central disk part 26 having a plurality of teeth 28 projecting therefrom which are on the order of saw teeth, but with the back face of each tooth extending substantially radially. The front faces of the teeth are inclined backwardly from a radial direction about 30°, and this operates to give a downward thrust on the material in the hopper toward the feed openings therein. The teeth 28 are alternately offset angularly on opposite sides of the plane of the central disk portion 26, as will be best seen in Figure 3. The amount of offset of the teeth in Figure 3 is about 45° on each side of the plane of the center portion 26, but the particular angle of offset will vary with the size of the teeth and the size of the feed opening in the bottom of the hopper with which the agitator blade cooperates.

Each agitator blade is preferably provided with a hub portion 30 formed from the material of the blade and by means of which the agitator blade is secured to shaft 18, as by welding. Each agitator blade is also associated with a feed opening 34 in the hopper bottom 22. The side openings 34 are preferably rectangular in shape with the side edges thereof positioned so that the teeth 28 of the associated agitator blade sweep close thereby. This will best be seen in Figure 3, and at this point it will be apparent that the angular offset of the teeth of the agitator blade will be determined by the size of the feed opening in the bottom of the hopper and the size of the teeth on the agitator blade, the said offset being adjusted so that the tips of the teeth will pass fairly close to the side edges of the feed opening.

Mounted on the bottom surface on bottom part 22 of the hopper is a slide plate 36 having regulating openings 38 therein adapted for variable registration with the feed openings 34. Slide plate 36 is slidably supported on the lower surface of hopper bottom 22, as by the turned-over edge parts 40 which may be engaged by resilient hooks or clamps.

The regulating openings 38 in slide plate 36 preferably take the form illustrated in Figure 5, and which form consists of a rectangular part 42 the same size as the rectangular feed opening 34 and a triangular enlargement 44 on one side. This arrangement permits gradual reduction of the effective size of the discharge opening in the bottom of the hopper by shifting the slide plate radially as it is viewed in Figure 5, as, for example, into the several positions indicated by the dashed lines.

It will be evident that the teeth of the agitator blade will always sweep close by the side edges of the feed opening in the bottom of the hopper, regardless of the position to which the slide plate is adjusted, and that even when the effective feed opening in the bottom of the hopper is reduced to a very small area, at least half of the teeth of the agitator blade are effective for discharging the material to be dispensed therethrough.

When the effective feed opening is reduced to such a small value, the other teeth on the agitator blade are effective for maintaining the material in the hopper in a fluent condition and for breaking up hard lumps of the material that may be therein.

The agitator structure may include rods 46 extending parallel with shaft 18 and through the agitator blades, as illustrated in Figure 2, for the purpose of further agitating the material in the hopper, if so desired.

In certain constructions, where the agitator blades are spaced relatively widely apart, such rods might be desirable, but in other cases, when the agitator blades are fairly close together, such rods would be unnecessary.

In the arrangement illustrated in Figure 6, the bottom of the hopper is formed to an arcuate configuration, and the slide plate on the bottom of the hopper is correspondingly shaped. The advantage exists for the Figure 6 construction that the hopper can be shaped to conform more exactly to the periphery of the agitator blades, but the disadvantage is present over the Figure 2 construction that it is somewhat more difficult to form the bottom part of the hopper and the slide plate, and somewhat more difficulty will be had in obtaining a close fit therebetween.

The Figure 7 arrangement shows the bottom of the hopper formed with only two bends therein, and this configuration offers the advantage of the greatest simplicity of forming the hopper bottom and the slide plate, but presents the disadvantage that there are large dead spaces in the corners of the hopper in which material might accumulate that would require manual effort to remove or dislodge.

While no means have been illustrated for shifting the slide plate along the hopper, it will be understood that any suitable means could be provided for effecting adjustment of the slide plate lengthwise of the hopper, preferably some means carried by the hitch frame and adjustable from the forward end thereof, as illustrated in my co-pending applications Serial No. 83,211, filed March 24, 1949, Patent No. 2,646,745, dated July 28, 1953, and Serial No. 115,595, filed September 14, 1949, Patent No. 2,703,193, dated March 1, 1955. As explained previously, the arrangement of the present invention provides for wide variation in the discharge rate from the material dispenser, and the means for adjusting the slide plate could be correspondingly graduated so the operator would know at all times at what rate the material was being dispensed.

It will be understood that this invention is susceptible to modification in order to adapt it to different usages and conditions, and, accordingly, it is desired to comprehend such modifications within this invention as may fall within the scope of the appended claims.

I claim:

1. In an agricultural material spreader; a horizontal hopper, a plurality of feed openings distributed in a line along the bottom of the hopper, said feed openings being substantially rectangular with a pair of their opposite side edges extending in a direction normal to the said line, an agitator shaft in the hopper extending parallel to said line, an agitator and feed blade on the shaft located above each of said openings, each said blade comprising a flat central portion and teeth extending from the periphery thereof part-way through and sweeping closely by the side edges of the associated feed opening when the said shaft is driven in rotation, succesive of said teeth being formed angularly outwardly from the plane of the blade in respectively opposite directions, and shutter means mounted externally of said hopper adjustable thereon for varying the effective size of said feed openings.

2. In an agricultural material spreader, a horizontal hopper, the bottom of said hopper having a plurality of feed openings distributed therealong in a line, said feed openings being substantially rectangular and having a pair of opposite side edges extending in a direction normal to said line, an agitator shaft journalled in said hopper on an axis parallel to said line, an agitator and feed blade on the said shaft in the vertical plane of each said opening, each said blade comprising a flat central portion and peripheral teeth extending part-way through said opening and successive of said teeth being formed outwardly from the plane of the blade at respectively opposite angles so as to sweep close by the said side edges of the opening when the shaft is rotated, the bottom of the hopper being formed to the shape of a portion of a polygon so as to approximate the shape of said feed blades adjacent thereto, and a slide plate mounted externally of the hopper on the bottom comprising openings therein adapted for registration with said feed openings, said plate being slidable axially along said hopper for varying the degree of registration of said openings thereby to vary the effective size of said feed openings, the openings in said slide plate each comprising a rectangular portion the size of the adjacent feed opening in the hopper, and a cut-out extending from one side of the rectangular portion and tapering inwardly.

3. In an agricultural material spreader; a horizontal hopper, the bottom of said hopper having a plurality of feed openings distributed therealong in a line, said feed openings being substantially rectangular and having a pair of opposite side edges extending in a direction normal to said line, an agitator shaft journalled in said hopper on an axis parallel to said line, an agitator and feed blade on the said shaft in the vertical plane of each said opening, each said blade comprising a flat central portion and peripheral teeth extending angularly outwardly on both sides of the plane of the blade part-way through said opening and sweeping close by the said side edges thereof when the shaft is rotated, the bottom of the hopper being formed to the shape of a portion of a polygon so as to approximate the shape of said feed blades adjacent thereto, a slide plate mounted externally of the hopper on the bottom comprising openings therein adapted for registration with said feed openings, said plate being slidable axially along said hopper for varying the degree of registration of said openings thereby to vary the effective size of said feed openings, the openings in said slide plate each comprising a rectangular portion the size of the adjacent feed opening in the hopper, and a triangular cut-out portion extending from one side of the rectangular portion of the said opening.

4. An agitator and feed blade for a material distributor of the type described comprising; a flat circular blade adapted for being mounted on a shaft to be driven thereby, and teeth projecting outwardly from the periphery of said blade, successive of said teeth being formed laterally outwardly angularly from the plane of said blade in respectively opposite directions, said teeth having their trailing sides in planes substantially radial of the said blade and their leading sides inclined backwardly from the direction of rotation of the blade.

5. In an agricultural material spreader; a horizontal hopper, a plurality of feed openings distributed in a line along the bottom of the hopper, said feed openings being substantially rectangular with a pair of opposite side edges extending in a direction normal to the said line, an agitator shaft in the hopper extending parallel to said line, a flat agitator and feed blade on the shaft in vertical planar alignment with each of said openings, each said blade comprising teeth extending from the periphery thereof part-way through the associated feed opening when the said shaft is driven in rotation, said teeth comprising one group bent out from the plane of the blade in one direction so as to run close by one of said side edges and a second group bent out from the said plane in the opposite direction so as to run close by the other of said side edges whereby the entire width of said opening is swept by the blade, and rod means extending parallel with said shaft but displaced radially outwardly from the shaft and inwardly of the said teeth and supported by the said blades for assisting in breaking up the material being distributed.

6. In a material spreader for agricultural materials having a horizontal hopper with a discharge opening in the bottom having straight side edges, a flat agitator blade rotatably mounted in the hopper in a vertical plane parallel to said side edges and passing through said opening and said blade having peripheral teeth extending outwardly therefrom at an angle from the plane of the blade with successive of said teeth extending in opposite directions from said plane, said teeth sweeping closely by the side edges of said opening and extending part-way therethrough as said blade is rotated, and said teeth forming the sole means for supplying the material to be distributed to said opening and for driving it therethrough.

7. In a material spreader for agricultural materials having a horizontal hopper with a discharge opening in the bottom having straight side edges, a flat agitator blade rotatably mounted in the hopper in a vertical plane parallel to said side edges and passing through said opening and said blade having peripheral teeth extending therefrom at an angle to the plane of the blade, successive of said teeth being formed out of the plane of the blade in respectively opposite directions whereby the teeth are arranged to sweep closely by the said side edges of said opening and to extend part-way therethrough as said blade is rotated, said teeth forming the sole means for supplying the material to be distributed to said opening and for driving it therethrough, and shutter means mounted outside said hopper on the bottom for varying the effective size of said feed opening.

8. In a material spreader for agricultural materials having a horizontal hopper with a discharge opening in the bottom having straight side edges, a flat agitator blade rotatably mounted in the hopper in a vertical plane parallel with said side edges and passing through said opening and said blade having peripheral teeth extending outwardly therefrom and formed angularly outwardly from the plane of the blade so as to sweep closely by the said side edges of said opening, said teeth extending part-way through said opening, said teeth forming the sole means for supplying the material to be distributed to said opening and for driving it therethrough, and shutter means mounted outside said hopper against the bottom thereof slidable thereon for varying the effective size of said feed opening, said teeth having their sides which are leading when the blade is rotating inclined backwardly from a radial direction so as to exert a downward component of thrust on the material in the hopper to drive it through the said feed opening.

9. In a material spreader for agricultural materials having a horizontal hopper with a rectangular discharge opening in the bottom, a flat agitator blade rotatably mounted in the hopper in a vertical plane passing through the longitudinal center line of said opening and said blade having peripheral teeth extending outwardly therefrom, said teeth angling laterally from the plane of the blade and being arranged to sweep closely by the side edges of said opening and to extend part-way therethrough as said blade is rotated, said teeth forming the sole means for supplying the material to be distributed to said opening and for driving it therethrough, and shutter means engaging the outside of said hopper on the bottom slidable therealong for varying the effective size of said feed opening, said teeth having their sides which are leading when the blade is rotating inclined backwardly from a radial direction so as to exert a downward component of thrust on the material in the hopper to drive it through the said feed opening, successive of said teeth being formed laterally outwardly of the plane of said blade in respectively opposite directions.

References Cited in the file of this patent

UNITED STATES PATENTS

| | | |
|---|---|---|
| 675,958 | Liebert | June 11, 1901 |
| 1,179,285 | Crenshaw | Apr. 11, 1916 |
| 1,733,722 | Cotner | Oct. 29, 1929 |
| 2,019,385 | Baucom | Oct. 29, 1935 |
| 2,510,231 | Juzwiak | June 6, 1950 |
| 2,541,008 | Stahmer et al. | Feb. 6, 1951 |
| 2,626,729 | Ajero | Jan. 27, 1953 |